(12) United States Patent  
Nakayama

(10) Patent No.: US 6,425,623 B2
(45) Date of Patent: Jul. 30, 2002

(54) RETRACTABLE VISOR FOR AN AUTOMOBILE WINDSHIELD

(75) Inventor: Shoichi Nakayama, Tokyo (JP)

(73) Assignee: Senfuji Auto Company, Incorporated, Tokyo (JP)

( * ) Notice: Subject to any disclaimer, the term of this patent is extended or adjusted under 35 U.S.C. 154(b) by 0 days.

(21) Appl. No.: 09/804,513

(22) Filed: Mar. 12, 2001

(30) Foreign Application Priority Data

Mar. 17, 2000 (JP) ......................................... 2000-120149

(51) Int. Cl.[7] ................................................. B60J 11/00
(52) U.S. Cl. ........................................... 296/136; 296/98
(58) Field of Search ............................ 296/95.1, 97.1, 296/97.8, 98, 99.1, 136

(56) References Cited

U.S. PATENT DOCUMENTS

| | | | | | |
|---|---|---|---|---|---|
| 1,545,592 A | * | 7/1925 | Mathews | ............... | 296/97.8 X |
| 1,750,888 A | * | 3/1930 | Harrold | ..................... | 296/95.1 |
| 2,458,918 A | * | 1/1949 | Rea | ............................. | 296/95.1 |
| 2,528,903 A | * | 11/1950 | Nichols | ..................... | 296/95.1 |
| 2,570,399 A | * | 10/1951 | Smith | ......................... | 296/95.1 |
| 2,621,071 A | * | 12/1952 | Plevak et al. | ............... | 296/95.1 |
| 3,050,075 A | * | 8/1962 | Kaplan et al. | ................. | 296/98 |
| 4,758,041 A | * | 7/1988 | Labeur | ....................... | 296/97.1 |
| 4,929,016 A | * | 5/1990 | Kastanis | ..................... | 296/136 |
| 5,230,545 A | * | 7/1993 | Huang et al. | ............... | 296/95.1 |
| 5,232,244 A | * | 8/1993 | Itoh | ....................... | 296/97.8 X |
| 5,433,499 A | * | 7/1995 | Wu | ............................ | 296/95.1 |
| 5,443,300 A | * | 8/1995 | Mohammed | ........... | 296/97.8 X |
| 5,560,668 A | * | 10/1996 | Li | ............................... | 296/97.8 |
| 5,762,393 A | * | 6/1998 | Darmas, Sr. | ................. | 296/98 |
| 6,012,759 A | * | 1/2000 | Adamek | ..................... | 296/136 |
| 6,095,231 A | * | 8/2000 | Hahn | ..................... | 296/97.8 X |
| 6,279,984 B1 | * | 8/2001 | Reina, Jr. | ............... | 296/95.1 X |

* cited by examiner

*Primary Examiner*—Stephen T. Gordon
*Assistant Examiner*—Lori L Coletta
(74) *Attorney, Agent, or Firm*—Jordan and Hamburg LLP

(57) ABSTRACT

A visor which is installed over an automobile windshield and a visor housing which can house the visor on a roof of an automobile is disclosed. A pair of visor holders connected to a front end of the visor protects the visor from air pressure created when the automoble is in motion.

13 Claims, 3 Drawing Sheets

RETRACTABLE VISOR FOR AN AUTOMOBILE WINDSHIELD

BACKGROUND OF THE INVENTION

The present invention relates to automobile accessories, more particularly to accessories used to protect an automobile windshield. Most specifically, this invention relates to a retractable visor which is adapted to be installed over the windshield and can be retracted into and extended out from a visor housing.

In general, automobile windshields have been manufactured for the purpose of shielding automobiles and automobile drivers against wind, rain or snow. More specifically, the windshields have been designed so as not to allow the rain or snow inside the automobiles.

The rain or snow held on the surface of the automobile windshield usually blocks the outside view through the windshield. In addition, the windshield of an automobile parked outdoors at night during the winter months often becomes frosted over.

For the purpose of preventing the rain, snow or frost from covering the windshields of the automobiles, today's automobile windshields are equipped with windshield wipers.

The windshield wipers provided on the automobile cannot secure sufficient visibility for the driver when it rains or snows heavily, since the movement of the windshield wipers is not sufficiently efficient in such a case. Furthermore, the movement of the windshield wipers themselves frequently obstructs the driver's view. In addition, it is very difficult to remove the frost from the surface of the windshield with the wipers.

On the other hand, the roof of the automobile parked in direct rays in midsummer becomes overheated to the extent that the driver has to experience an uncomfortable degree of heat inside the automobile. Furthermore, there have been numerous reports of cases in which infants left inside the automobiles suffocated due to the heat inside.

SUMMARY OF THE INVENTION

The present invention has been accomplished in view of the above-mentioned problems.

An object of the present invention to provide a retractable visor for an automobile windshield, which may secure the sufficient visibility for an automobile driver even if it rains or snows heavily.

Another object of the present invention is to provide a retractable visor for an automobile windshield, which may eliminate the use of windshield wipers, whose movement obstructs the driver's view, operated at the time of raining or snowing, or removing frost from the surface of a windshield.

A further object of the present invention is to provide a retractable visor for an automobile windshield, which may prevent the air inside an automobile from being excessively heated when the automobile is parked in direct rays in midsummer.

Other objects of the present invention will become apparent from the following novel constituent means whose features are listed below.

According to one feature of the present invention, there is provided a retractable visor for an automobile windshield, which comprises visor housing means for housing a visor element, which the housing means is attached to a roof lying above the windshield of an automobile; and the visor element capable of being retracted into and extended out from the housing means in a sliding manner.

According to another feature of the presents invention, there is provided a retractable visor for an automobile windshield, which comprises a visor element installed over the windshield of an automobile, which the visor element has a semi-cylindrical inflexible plate form; and visor housing means for housing the visor element on a roof of the automobile, which the housing means has a semi-cylindrical form.

According to a further feature of the present invention, there is provided a retractable visor for an automobile windshield, which comprises a visor element installed over the windshield of an automobile; visor housing means for housing the visor element on a roof of the automobile; and visor holding means for holding the visor element, one end of which the holding means is connected to a front end of the visor element, while an other end of which the holding means is mounted on a body of the automobile in a sliding manner.

According to a still further feature of the present invention, there is provided a retractable visor for an automobile windshield according to the above said feature, wherein the other end of the holding means is mounted on the body of the automobile in a rotational manner, instead of the sliding manner.

BRIEF DESCRIPTION OF THE DRAWINGS

While the specification concludes with claims particularly pointing out and distinctly claiming the subject matters of the present invention, it is believed that this invention will be better understood from the following description taken in connection with the accompanying drawings in which:

DETAILED DESCRIPTION OF THE INVENTION

An example of a general embodiment of a retractable visor for an automobile windshield according to the present invention is described below.

The components according to the present invention include a visor 10 which can be installed over an automobile windshield and a visor housing 20 which houses the visor 10 on a roof 31 of an automobile 30.

The embodiment of the, retractable visor for an automobile windshield according to the present invention is described below in more detail with reference to the attached figures.

Figure 1:
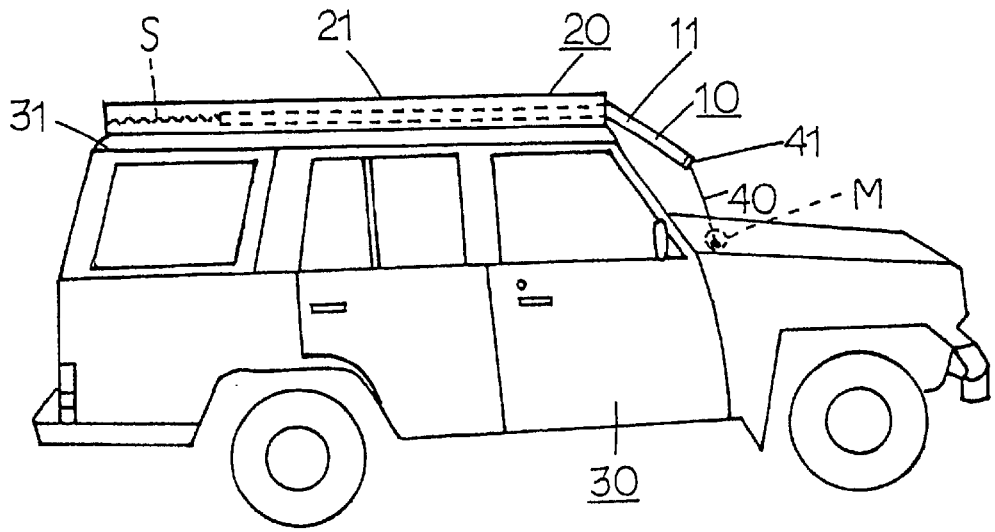
FIG. 1 is aside elevation view of a retractable visor for an automobile windshield according to an embodiment of the present invention, while the visor is mounted and used on an automobile.
Figure 2:
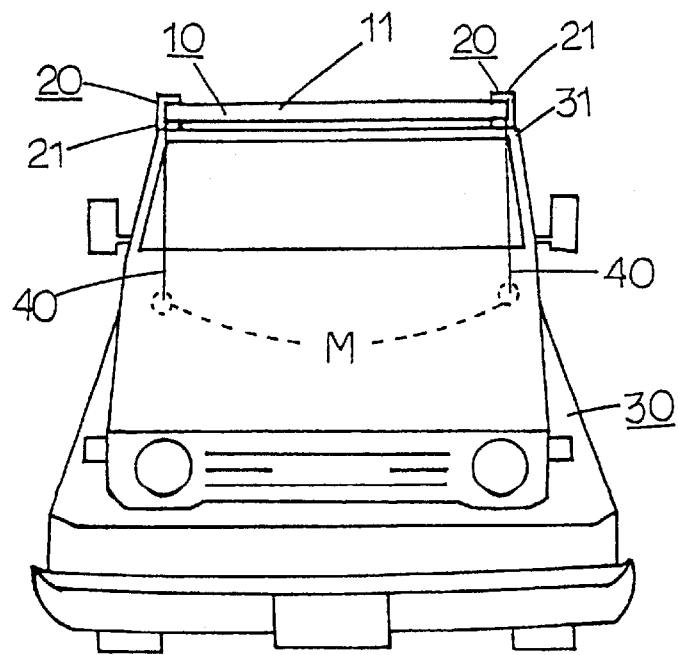
FIG. 2 is a front view of the retractable visor shown in FIG. 1, while the visor is housed in a visor housing.
Figure 3:
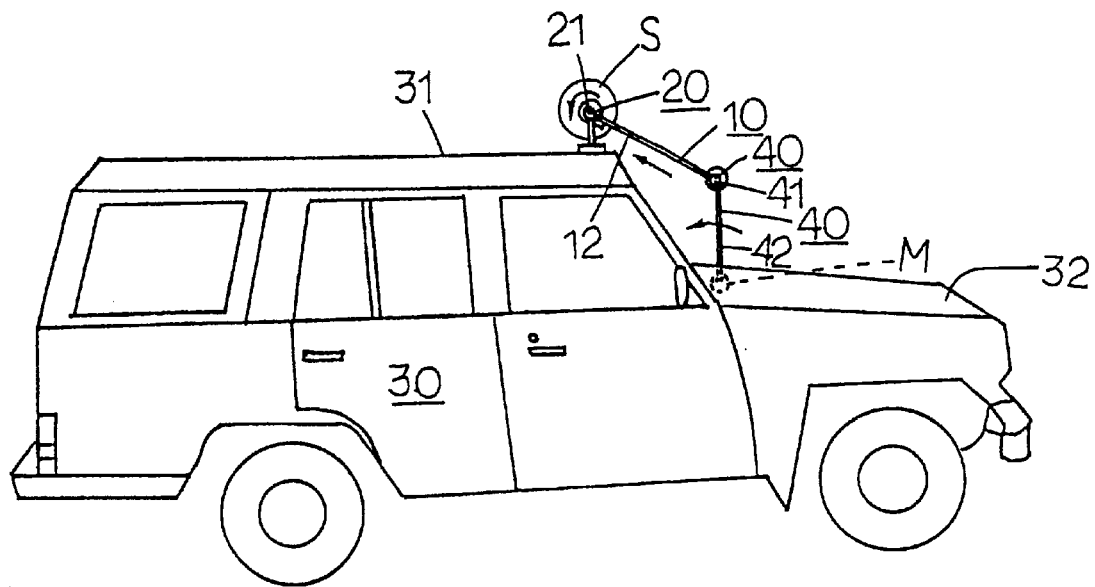
FIG. 3 is a side elevation view of another retractable visor for an automobile windshield which differs from that represented in FIG. 1, while the visor is mounted and used on an automobile.
Figure 4:
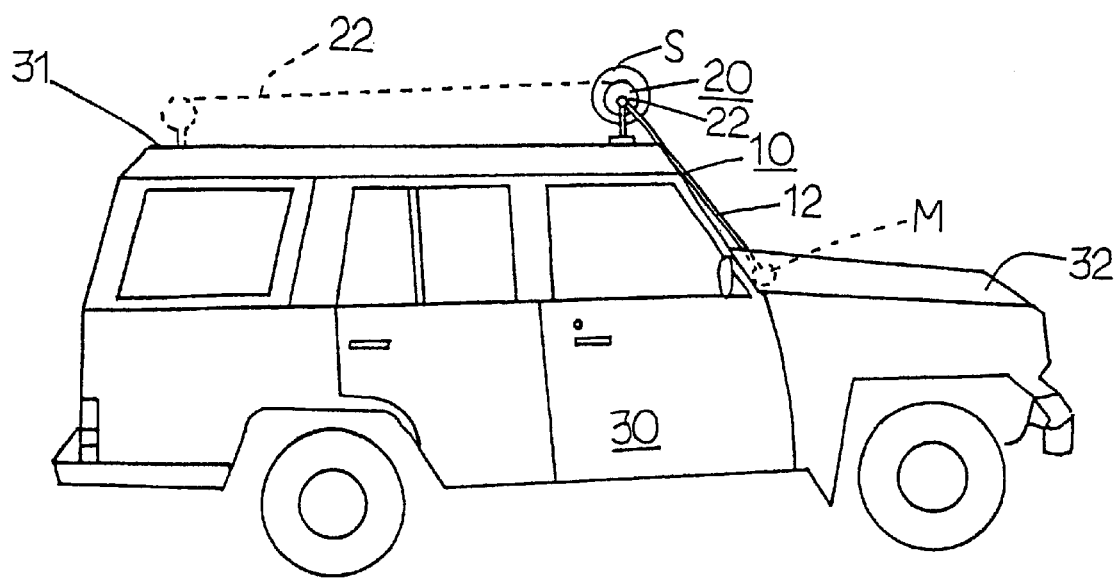
FIG. 4 is a front view of the retractable visor shown in FIG. 3, while the visor is housed in a visor housing.

The visor 10 is first adapted for installation over the windshield of the automobile 30. The visor 10 may comprise a flexible plate 11 as shown in FIGS. 1 and 2, or may take the form of a film 12 as shown in FIGS. 3 and 4.

Next, a visor housing 20 is adapted to house the visor 10 on the roof 31 of the automobile 30. In the figures, these particular sections are drawn to a large scale for the purpose of clarification.

In case that the visor 10 takes the shape of a flexible plate 11, the visor housing 20 has a slot in which both sides of the visor 10 can be accommodated in a sliding manner. In case the visor 10 takes the shape of a film 12 to the contrary, a winding shaft 21 as shown in FIG. 3 may be employed to take up the film 12 on the winding shaft 21.

In addition to the above, a pair of stick-shaped visor holders 40 are provided between the front end of the visor 10 and the body 32 of the automobile 30 to protect the, visor 10 from the air pressure created when the automobile 30 is in motion.

The visor holder 40 in the drawing comprises, for clarification purpose, a front-end cross rod 41 which are connected to the front-end of the visor 10 and a pair of vertical rods 42 which are connected in a rotational manner to both ends of the front-end cross rod 41 and also to the body 32 of the automobile 30.

In case that the visor 10 takes the form of the flexible plate 11, the vertical rods 42 may take the form of ropes or strings. However, in case the visor 10 takes the form of the film 12, the vertical rods 42 must take the form of a semi-rotational mechanism.

Instead of the vertical rods 42 taking the form of the semi-rotational mechanism above, a better embodiment may employ side rods attached to the side portions of the visor 10 in such a manner that the side rods can be slid backwards and forwards along the side portions of the visor 10.

If the visor 10 is extended lengthwise, the visor 10 can serve as a shade for the roof 31 of the automobile 30 when the visor is retracted from the windshield area over the roof 31, which will prevent the roof 31 of the automobile 30 from becoming overheated even if the automobile is parked in direct rays in midsummer and further, maintain the condition inside the automobile 30 at tolerable levels.

In addition, in case the visor 10 takes the shape of a sheet 22 as shown in FIG. 4 with a dotted line, the winding shaft (visor housing 20) can be installed in a rear position of the roof 31 so that the sheet 22 will serve as a shade.

Hereupon, in case a motor M is installed for the visor housing 20 and/or the visor holder 40, the visor 10 can be automatically retracted and extended therewith. The motor M above may be substituted by a spring coil S if the visor 10 takes the form of the film 12.

Furthermore, the visor housing 20 in each example mentioned above may be installed on the automobile 30 as an additional arrangement or be configured integrally with the automobile 30 from the outset as the automobile 30 is being designed.

Figure 5:
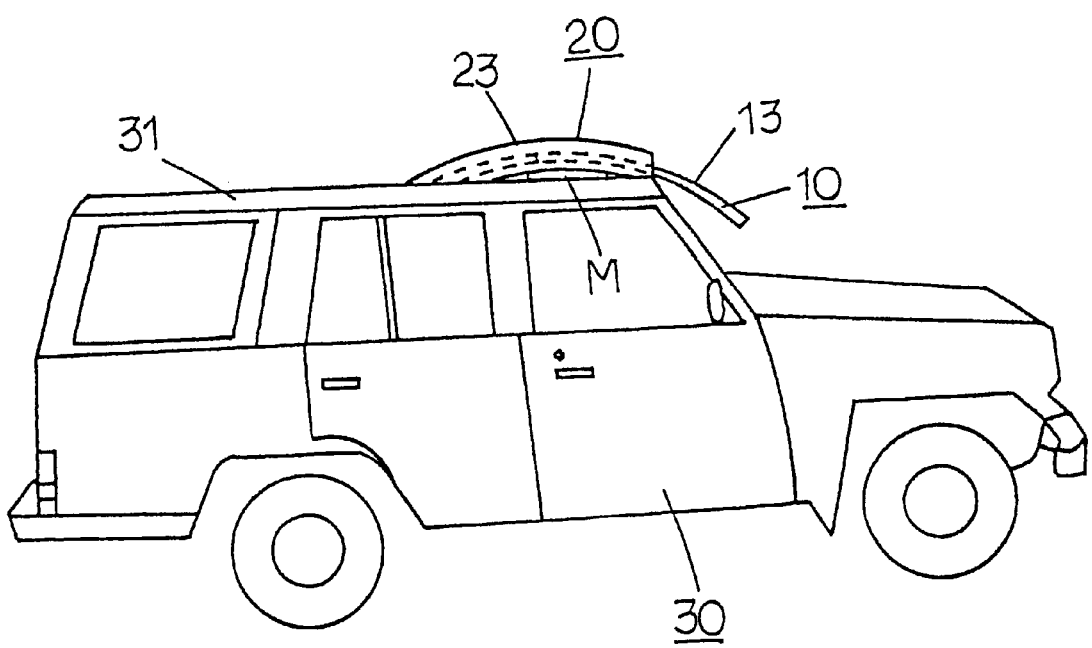
FIG. 5 is a side elevation view of still another retractable visor for an automobile windshield which differs from that represented in FIG. 1, while the visor is mounted and used on an automobile.

An example of a practical embodiment is also shown in FIG. 5. In this example, an inflexible plate visor 13 in a semi-cylindrical form and a visor housing 23 also in a semi-cylindrical form are employed.

Additionally, the inner part of each of the visor housings 20 and 23 shown in FIGS. 1 and 5 is empty or vacant. so that the visor 10 and the inflexible plate visor 13 are respectively housed therein.

As has been described above, the retractable visor for an automobile windshield according to the present invention used in such a manner as described herein can solve the problems mentioned above to bring about the following significant effects.

Namely, the wipers mounted on an automobile windshield can secure the clear vision for the driver because the visor for the windshield according to the present invention allows the wipers to operate efficiently over the windshield, which is protected by the visor from rain or snow even if it snows or rains heavily.

On the other hand, when it rains or snows lightly, the use of the visor can substantially eliminate the necessity to operate the wipers, with the windshield providing clear vision for the driver without the movement of the wipers. Also, the windshield can be protected from frost with the visor.

Further, if it rains or snows moderately, the driver may select light mode for the operation of the wipers, which also provides a good view for the driver.

Furthermore, the roof of an automobile parked in direct rays in midsummer can be protected by the visor to the extent that the air inside the automobile does not become excessively heated, which mechanism that conditions inside the automobile can be maintained at comfortable levels.

In addition to such comfort, the resulting advantages include the prevention of accidents involving the deaths of infants left inside an automobile due to excess temperatures inside.

What is claimed is:

1. A retractable visor for a vehicle windshield comprising:
 a visor member in the form of a sheet to cover a major portion of the vehicle windshield, said sheet permitting visibility therethrough and having sufficient strength to intercept climatic precipitation;
 a visor housing for housing said visor member, said visor housing being mountable on a vehicle roof;
 an extending device connected to the visor member and mountable on a hood of the vehicle for slidingly extending said visor member out of said visor housing and supporting said visor member spaced apart from the vehicle windshield; and
 a biasing device connected to the visor member for retracting said visor member into said visor housing and maintaining tension on said visor member in conjunction with said extending device such that said visor member is stable during vehicular operation.

2. The retractable visor of claim 1 wherein said visor member is a flexible sheet.

3. The retractable visor of claim 1 wherein said visor member allows for free movement of windshield wipers on the windshield of the vehicle when the visor member is in an extended position.

4. The retractable visor of claim 1 wherein the extending device includes a visor holder member for supporting the visor member, said visor holder member having a first end and a second end, said visor holder member being connected to the visor member at the first end of the visor holder member and being connectable to the hood at the second end of the visor holder member.

5. The retractable visor of claim 4 wherein the extending device provides a pivoting motion to the visor holder member such that the visor holder member pivots at the hood while the visor member is extended by the visor holder member.

6. The retractable visor of claim 5 wherein the extending device is provided with a motor connected to the visor holder member for extending the visor holder member such that the visor holder member extends the visor member.

7. A retractable visor for a vehicle windshield comprising:
 a flexible visor member in the form of a sheet to cover a major portion of the vehicle windshield, said sheet permitting visibility therethrough and having sufficient strength to intercept climatic precipitation;

a visor housing for housing said visor member, said visor housing being mountable on a vehicle roof;

an extending device connected to the visor member and mountable on a hood of the vehicle for extending said visor member out of said visor housing and supporting said visor member spaced apart from the vehicle windshield; and a winding device connected to the visor member for winding said visor member into said visor housing and maintaining tension on said visor member in conjunction with said extending device such that said visor member is stable during vehicular operation.

8. The retractable visor of claim 7 wherein said visor member allows for free movement of windshield wipers on the windshield of the vehicle when the visor member is in an extended position.

9. The retractable visor of claim 7 wherein the extending device includes a visor holder member for supporting the visor member, said visor holder member having a first end and a second end, said visor holder member being connected to the visor member at the first end of the visor holder member and being connectable to a vehicle hood at the second end of the visor holder member.

10. The retractable visor of claim 9 further comprising a motor for driving the winding device such that the visor member is retracted into the visor housing.

11. The retractable visor of claim 9 wherein the extending device is provided with a motor driving the visor holder member to extend the visor holder member such that the visor holder member extends the visor member.

12. The retractable visor of claim 9 wherein the extending device provides a pivoting motion to the visor holder member such that the visor holder member pivots at the hood while the visor member is extended by the visor holder member.

13. The retractable visor of claim 9 wherein the winding device is provided with a biasing device for providing a tensile force on the visor member.

* * * * *